United States Patent Office 3,124,950
Patented Mar. 17, 1964

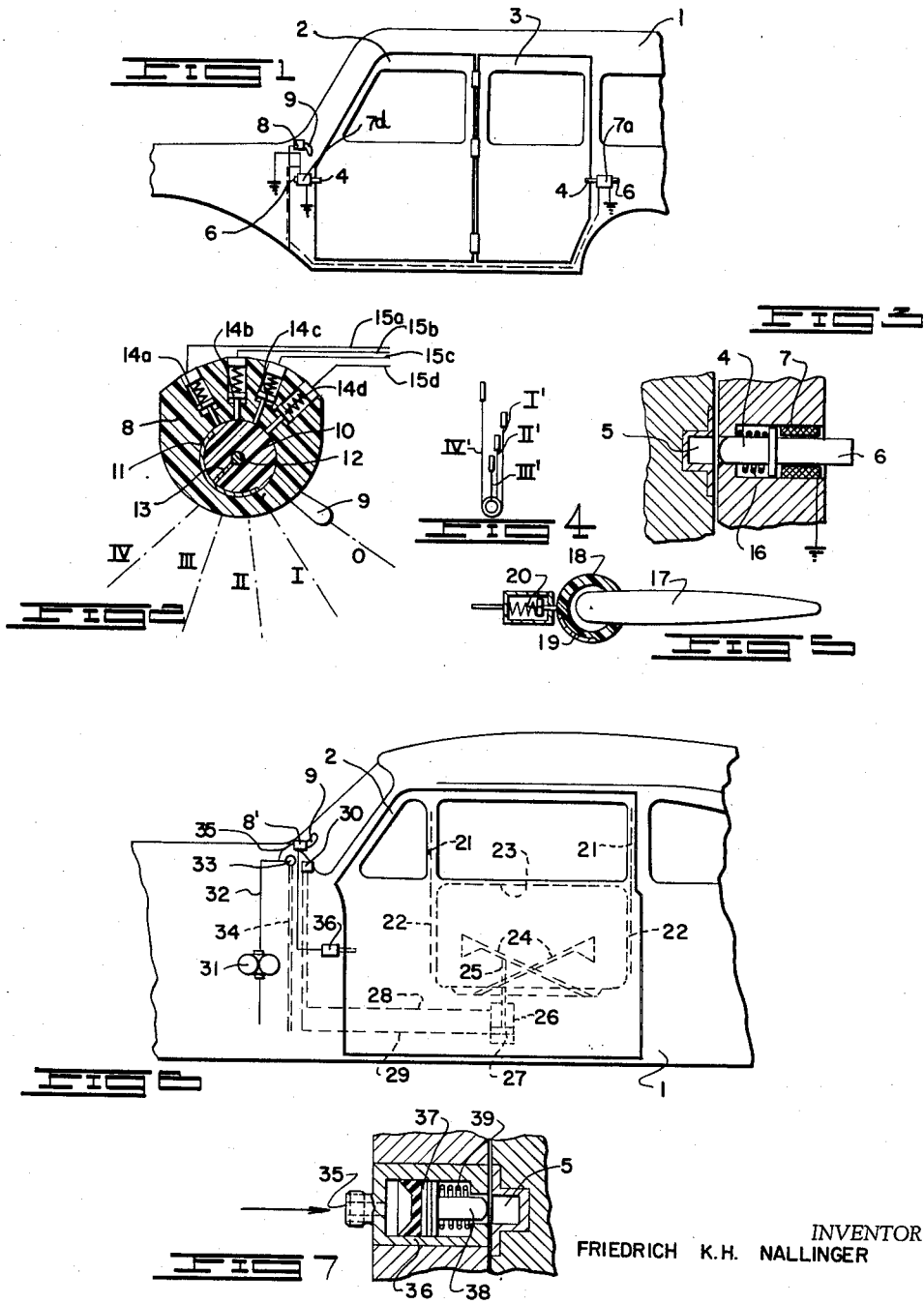

3,124,950
LOCKING MECHANISM FOR VEHICLES
Friedrich K. H. Nallinger, Stuttgart, Germany, assignor to Daimler-Benz Aktiengesellschaft, Stuttgart-Unterturkheim, Germany
Filed Jan. 3, 1961, Ser. No. 80,273
Claims priority, application Germany Dec. 31, 1959
3 Claims. (Cl. 70—264)

The present invention relates to a locking mechanism for vehicles, and more particularly to locking mechanisms for the doors of a multi-door vehicle, especially motor vehicle, in which the doors may be selectively locked and unlocked in predetermined sequence.

Locking or bolting mechanisms are known in the prior art in connection with multi-door motor vehicles in which all the doors may be simultaneously locked and also, in the reverse, simultaneously unlocked from a single place, especially from the seat of the driver. Such an arrangement, however, is inadequate in the case when there exists the need that the passengers, for example, for purposes of control, are to board and leave the vehicle only through a certain door or doors, or if there is only to be prevented any inadvertent, accidental opening by children riding along in the vehicle of the doors which are within reach of the children.

The present invention eliminates these inadequacies and shortcomings of the prior art constructions and essentially consists in constructing the locking switch as locking-force distributor and operatively connecting the same to the individual locking mechanisms of the respective individual doors in such a manner that at first only a portion of the doors is locked and only upon further actuation of the switch or central lock-actuation means, the remainder of the doors are locked or unlocked again. The actuation of the locking mechanisms may take place in accordance with the present invention, either electrically, hydraulically or pneumatically or by any suitable, known combination of such systems.

Accordingly, it is an object of the present invention to provide a control system for selectively locking and unlocking the doors of a vehicle from a central point which obviates the inadequacies and shortcomings encountered with the prior art constructions.

Another object of the present invention resides in the provision of a selective, central control means for the locking and unlocking mechanisms of doors of motor vehicles in which only one or several but less than all the doors may be selectively locked or unlocked before the remainder of the doors are also locked or unlocked, respectively, by actuating the corresponding locking mechanisms thereof.

Still another object of the present invention resides in the provision of a control mechanism for use in connection with a locking installation for the doors of the vehicle, actuated by means of an auxiliary force, in which a sequential energization of the auxiliary force for the respective actuating mechanisms is made possible at the discretion of the driver.

Still a further object of the present invention resides in a selective control system for the locking mechanisms of the doors in motor vehicle doors which permits selective control of the locking mechanism thereof to thereby effectively control the ingress and egress of the passengers and/or increase the safety to the passengers by preventing inadvertent, accidental or unauthorized opening of one or several doors.

These and other objects, features and advantages of the present invention will become more obvious from the following description when taken in connection with the accompanying drawing which shows, for purposes of illustration only, several embodiments in accordance with the present invention and wherein FIGURE 1 is a partial side elevational view of a motor vehicle with two doors disposed one behind the other in the vehicle body side wall, it being understood that the opposite side wall of the vehicle body may be constructed in an analogous manner;

FIGURE 2 is a cross sectional view of the switch for an electric actuation of the door locking mechanism according to the present invention;

FIGURE 3 is a partial cross sectional view through an electrically controlled door locking mechanism suitable for use with the arrangement of FIGURES 1 and 2;

FIGURE 4 is a schematic view of a further modified embodiment of a locking switch for the arrangement according to FIGURE 1;

FIGURE 5 is a switch operatively connected with the door handle for the locking control circuit in accordance with the present invention;

FIGURE 6 is a partial side elevational view of a motor vehicle having only one door in each of the oppositely disposed body side walls and provided with a locking mechanism according to the present invention which is actuated by a pressure medium, and FIGURE 7 is a locking bolt member actuated by a pressure medium for use in the arrangement according to FIGURE 6.

Referring now to the drawing wherein like reference numerals are used throughout the various views to designate like parts, and more particularly to FIGURE 1, two doors designated therein by reference numerals 2 and 3, arranged one behind the other, are provided in each side wall 1 of the motor vehicle. Both doors 2 and 3, of which there may exist a similar or dissimilar number on each side, are adapted to be locked by means of an electromagnetically actuated locking member 4 provided in addition to the locking mechanism of the conventionl door locks which are not illustrated in the drawing since these door locks may be of any suitable known construction and form no part of the present invention.

As may be readily seen from FIGURE 3, each of the door-locking bolt members 4 is arranged in front of a suitable recess 5 provided in the door frame and the rearward portion 6 thereof extends through an electric coil 7 which is supplied with current by means of a switch 8 (FIGURES 1 and 2) disposed within easy reach of the driver seated behind the steering wheel.

In the embodiment of FIGURE 2, the switch arrangement is made in such a manner that the shifting lever 9 rotates a shifting drum 10. The shifting drum 10 is made of a material which is electrically non-conductive i.e., insulating, and is covered over a portion thereof with an electrically conductive sliding contact member 11 which is connected with a central current supply line 12 of the shifting drum by means of a suitable connection 13. The line 12 is thereby operatively connected with one terminal of an electric current source, such as the vehicle battery while the other terminal of the battery may be grounded. A plurality of spring-loaded contact pins 14, dependent on the number of vehicle doors or locking places present in the vehicle, for example, four spring contact pins 14a to 14d in the illustrated embodiment, are distributed over an arc within the area of movement of the sliding contact 11 and are connected through a respective connecting line 15a through 15d to the coils 7a to 7d of the corresponding locking mechanisms 4, 5, 6, only coils 7a and 7d being shown in FIGURE 1 while coils 7b and 7c (not shown) are located at opposite doors.

*Operation*

The operation of the installation of FIGURES 1 through 3 becomes quite readily apparent from an inspection of FIGURE 2. In the position "0" of the switch lever 9, the latter is in the "off" position. No current flows in the off position "0" of lever 9 through any of the windings 7a through 7d, and the return springs 16 (FIGURE 3) of the locking pins 4 retain the latter, for example, completely in the retracted, unlocking positions thereof.

If the lever arm 9 is now moved to the position "I" of FIGURE 2, then the contact pin 14a comes into contact with the sliding contact member 11 of the shifting drum 10 to close an electric circuit and thereby connect the line 15a with the current source so as to energize this circuit and supply current therethrough which leads, for example, to the locking mechanism 7a of the left rear door 3 of the vehicle. As a result thereof, the coil 7a is energized and actuates the respective bolt member 4 (FIGURE 3) to move into the door recess 5 disposed in front thereof.

If the switch lever 9 is moved into the shifting position "II" of FIGURE 2, then, in the same manner, for example, the right rear door is locked whereas in the position "III" the right front door and finally in the position "IV," for example, the left front door adjacent the driver is selectively locked.

It is understood, however, that within the scope and spirit of the present invention any other locking sequence may be selected and that the number of doors to be selectively locked may vary at will from installation to installation.

Moreover, a separate locking switch I', II', III' and IV' each may be coordinated to a respective door, which are preferably rotatable about the same axis as illustrated in FIGURE 4. The arrangement of the individual switch of FIGURE 4 may be made thereby in such a manner that, for example, the switch lever IV' for locking the door adjacent the driver is effective as entrainment lever for the other switch levers I', II' and III', for example, in such a manner that if the lever IV' for locking the door adjacent the driver is rotated in the clockwise direction, simultaneously therewith the other switch levers I' through III' are taken along and therewith also the other doors are locked. Since such an arrangement is readily within the scope of a person skilled in the art, a description and illustration of the details thereof are dispensed with herein. For example, this may be attained readily by coordinating to the lever IV' an axially extending projection of such length as to extend within the path of all the other levers I' through III' to take along all the other three levers I', II' and III'. Of course, each lever may also be provided with such a projection so as to take along the next lower lever. By the same token, any other suitable selection and entrainment effect between individual or groups of levers may be imparted to the switch arrangement of FIGURE 4 by providing any suitable known control means producing the desired effect.

If it is desired that the locking installation does not remain energized constantly in the locking condition thereof, then it is also possible, for example, to construct each individual door knob or door handle as electric switch and to utilize the arrangement illustrated and described in connection with FIGURE 2 or with FIGURE 4 only as distributor. For that purpose, a switch disk 18 made of insulating material is connected with the door handle 17 as illustrated, for example, in FIGURE 5. The switch disk 18 is covered with a conductive sliding contact 19 which is disposed in the closing position of the door closely in front of the springy or spring-loaded contact pin 20 i.e., disposed closely adjacent but out of contact with pin 20 so that the moment the door lever or handle 17 is pivoted downwardly only a small distance or actuated otherwise only during its very initial phase, i.e., long before it begins to open the closure mechanism of the door, the contact arrangement 19 and 20 effectively closes the control circuit and thereby energizes the entire electric locking installation of the vehicle so that the door or doors are locked as corresponds to the adjustment or position of the distributor switch 8 according to FIGURES 2 or 4. Of course, all of the contact arrangements, namely one for each door as shown for example in FIGURE 5, are suitably connected in parallel, for example, between one terminal of the battery and line 12.

While the embodiments described so far hereinabove are actuated by means of an electric auxiliary force, the locking mechanism according to the present invention may also be actuated by a pressure medium forming the auxiliary force. Such a system is particularly appropriate if other installations actuated by a pressure medium such as, for example, displaceable windows, sliding doors or the like are already present. FIGURES 6 and 7 illustrate such an embodiment. In FIGURE 6, a known hydraulic actuating installation for a window adapted to be lowered and raised is illustrated in dash lines. A door 2 is provided along the side wall of the vehicle of which the window frame 21 is extended downwardly into a window guide means 22. The windowpane 23 is supported therein so as to be movable in the vertical direction. The window movement is initiated, for example, by means of two mutually crossing lift arms 24, and the latter are influenced by the piston rod 25 of a pressure piston 27 sliding within a cylinder 26. The cylinder space above and below the piston 27 is connected with one pressure supply line 28 and 29 each. Both lines 28 and 29 lead to a shifting valve 30 arranged within easy reach of the driver, whereby the windowpane 23 may be selectively raised and lowered, in a known manner, by actuation of valve 30. The fluid medium under pressure is supplied by a pump 31, which derives the same, for example, from the lubricating circulatory system of the engine and is supplied through the line 32 to the shifting valve 30. The control of pressure takes place by a valve 33 from which an excess pressure or over-flow line 34 leads back to the sump or oil supply of the internal combustion engine. The details of such hydraulic or pneumatic actuating system form no part of the present invention and are therefore not described in further detail.

According to the present invention a further pressure medium supply line 35 is branched off either in front or behind the excess pressure valve 33 which leads via a distributor valve 8' to the pressure cylinders 36 (FIGURE 7) of the vehicle doors of which only one cylinder and one door are shown in the drawing. A piston 37 slides together with a locking bolt member or plunger 38 within the pressure cylinder 36 which bolt member 38 is adapted to be brought into engagement with the locking recess 5 of the door by the pressure of the fluid medium against the force of a return spring 39.

Corresponding to the embodiment of the switch illustrated in FIGURES 2 and 4, the shifting valve 30, which may be of any known type of the prior art, may also be constructed as distributor valve so as to obtain a sequential locking or unlocking of the individual or group of doors.

While I have shown and described several embodiments in accordance with the present invention, it is understood that the same is not limited thereto but is susceptible of many changes and modifications within the spirit and scope of the present invention. For example, in lieu of the rotary switch 8 or valve 8' which may also be of the type adapted to be actuated only by means of a key to prevent unauthorized actuation thereof, any known push button or slide valve or contact arrangement may be used. Additionally, the locking mechanism does not have to engage necessarily with the door itself. The locking bolt member or the like in accordance with the present invention may also be so constructed and arranged as to engage with the locking mechanism of the door which is already present in the vehicle to produce a similar locking effect. However, a separate locking mechanism offers again the advantage that it may be constructed particularly strong and therefore increases the safety to the passengers.

Thus, it is quite clear that the present invention is susceptible of many changes and modifications within the spirit and scope thereof and I, therefore, do not wish to be limited to the details shown and described herein but intend to cover all such changes and modifications as are encompassed by the scope of the appended claims.

I claim:

1. In a motor vehicle having a passenger space and a front and a rear door on each side thereof, a locking mechanism including a locking device for each door having a locked-in position and a lock-releasing position, and means for locking-in said doors, when all said locking devices are in the lock-releasing position, in the sequence consisting of the right rear door, the left rear door, the front door opposite the vehicle driver and the front door adjacent the vehicle driver and releasing said doors, when all said doors are in locked-in position, in a sequence which is the reverse of said first-named sequence, said last-mentioned means for locking-in said doors including power means, a locking-in and lock-releasing distributor arranged within the passenger space of the vehicle and adapted to be operated manually with ease from the driver's seat, said distributor including a movable part carrying at least one power-distributing component arranged in a housing with four power-collecting elements, and means for connecting said power-collecting elements individually with the individual locking devices of the respective vehicle doors, said power-collecting elements being operatively connected with said power means in sequence by the power-distributing component of the movable distributor part whereby when said power-distributing component connects a respective power-collecting element with said power means the individual locking device of the respective vehicle door associated therewith through said distributor is placed in the locking position, the power-collecting elements being arranged in said housing such that the power-collecting element connected to the locking device of the right rear door is operated first by said movable distributor part when the same is moved from its lock-releasing initial position, the power-collecting element connected to the locking device of the left rear door being operated second, the power-collecting element connected to the locking device of the door adjacent to the passenger front seat opposite the driver being operated third, and the power-collecting element connected to the locking device of the door adjacent to the driver's seat being operated fourth.

2. In a motor vehicle having a passenger space and a front and a rear door on each side thereof, a locking mechanism including an electrically operated locking device for each door having a locked-in position and a lock-releasing position and means for locking-in said doors, when all said locking devices are in the lock-releasing position, in the sequence consisting of the right rear door, the left rear door, the front door opposite the vehicle driver and the front door adjacent the vehicle driver and releasing said doors, when all said doors are in locked-in position, in a sequence which is the reverse of said first-named sequence, said last-mentioned means for locking-in said doors including a source of electric power, a locking-in and lock-releasing distributor consisting of an electric switch arranged within the passenger space of the vehicle and adapted to be operated manually with ease from the driver's seat, said switch including a rotary part carrying at least one power-distributing component arranged in a housing with four power-collecting electric contact elements and circuit means for connecting said contact elements individually with the individual locking devices of the vehicle doors, said contact elements being operatively connected with said power source in sequence by the power-distributing component of the rotary switch part whereby when said power-distributing component connects a respective contact element with said power source, the individual locking device of the respective vehicle door associated therewith through said switch is placed in the locking position, the contact elements being arranged in said housing such that the contact element connected to the locking device of the right rear door is operated first by said rotary switch part when the same is moved from its lock-releasing initial position, the contact element connected to the locking device of the left rear door being operated second, the contact element connected to the locking device of the door adjacent to the passenger front seat opposite the driver being operated third, and the contact element connected to the locking device of the door adjacent to the driver's seat being operated fourth.

3. In a motor vehicle having a passenger space and a front and a rear door on each side thereof, a locking mechanism including a pressure fluid operated locking device for each door having a locked-in position and a lock-releasing position and means for locking-in said doors, when all said locking devices are in the lock-releasing position, in the sequence consisting of the right rear door, the left rear door, the front door opposite the vehicle driver and the front door adjacent the vehicle driver and releasing said doors, when all said doors are in locked-in position, in a sequence which is the reverse of said first-named sequence, said last-mentioned means for locking-in said doors including a source of pressure fluid, a locking-in and lock-releasing distributor consisting of a valve means arranged within the passenger space of the vehicle and adapted to be operated manually with ease from the driver's seat, said valve means including a housing having an inlet means connected to said source of pressure fluid and four fluid-collecting conduits each operatively connected with a respective locking device, and operatively connected with said power means, said power-collecting a movable valve member for connecting said outlets individually in sequence with said inlet, said outlets being arranged such that the individual locking devices of the vehicle doors are connected with the power source through said distributor in a sequence starting when said locking devices are all in the lock-releasing position, consisting of first the locking device associated with the right rear door, second the locking device associated with the left rear door, third the locking device associated with the door adjacent to the passenger front seat opposite the driver, and fourth the locking device associated with the door adjacent to the driver's seat.

References Cited in the file of this patent

UNITED STATES PATENTS

| | | |
|---|---|---|
| 1,816,504 | Ulrich | July 28, 1931 |
| 2,197,692 | Gill | Apr. 16, 1940 |
| 2,221,044 | Dimick | Nov. 12, 1940 |
| 2,243,708 | Joyce | May 27, 1941 |
| 2,260,326 | Marine | Oct. 28, 1941 |
| 2,280,954 | Kahn | Apr. 28, 1942 |
| 2,530,628 | Pivero | Nov. 21, 1950 |
| 2,765,648 | Hatcher | Oct. 9, 1956 |